Albert G. KETZ
Jan M. BLOEMHOF
INVENTORS

Nov. 7, 1961 A. G. KETZ ET AL 3,007,380
METHOD AND A MACHINE FOR UTILIZING
ACCOUNTING AND SIMILAR DATA
Filed Aug. 25, 1958 2 Sheets-Sheet 2
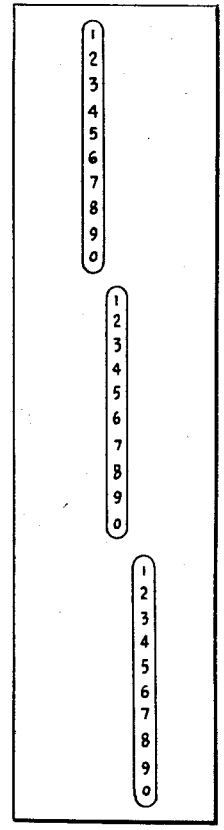
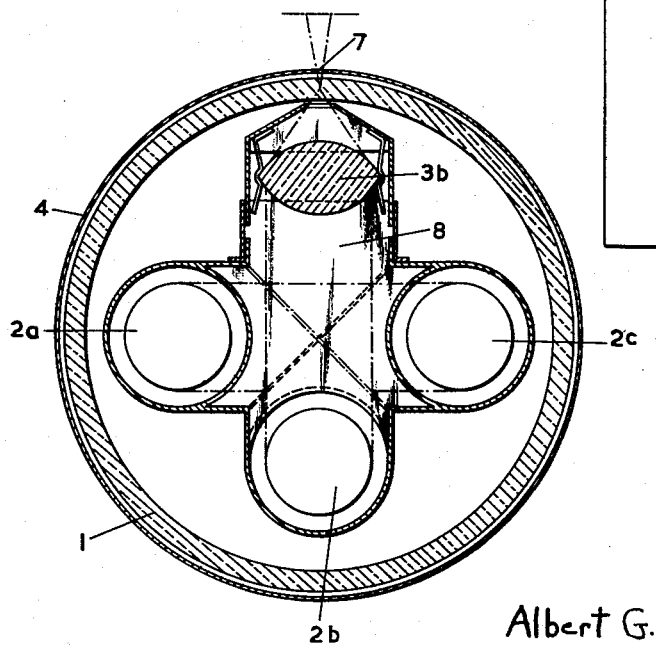
Albert G. KETZ
Jan M. BLOEMHOF
INVENTORS
BY:
Wenderoth, Lind & Ponack
Attys

United States Patent Office

3,007,380
Patented Nov. 7, 1961

3,007,380
METHOD AND A MACHINE FOR UTILIZING ACCOUNTING AND SIMILAR DATA
Albert G. Ketz and Jan M. Bloemhof, Apeldoorn, Netherlands, assignors to N.V. Lichtdrukpapierfabriek "De Atlas," Delft, Netherlands, a corporation of the Netherlands
Filed Aug. 25, 1958, Ser. No. 757,060
Claims priority, application Great Britain Aug. 28, 1957
1 Claim. (Cl. 95—4.5)

It is known and quite usual to punch accounting or similar data, either separately or in interrelated combinations according to predetermined codes into so-called Hollerith cards or punch cards.

For utilizing said data for instance for performing calculations by means of said data and/or tabulating some of the data present in a number of cards or calculated therefrom, the punch cards are fed to a machine which, under control of the punch holes, is able to perform electromagnetically or photo-electrically the required calculations, for instance multiplications, additions and subtractions and so on as required, and to print the results in a suitable manner on other cards or forms.

In accounting, mostly two kinds of data are concerned, namely, fixed and variable data. Fixed data generally comprise inter alia the description of the article, its code number, the price per unit, the discount, if any, etc. Variable data which often recur comprise the quantity of ordered units, the name and the address of the client and so on.

If in a conventional way exclusively punch cards are used, then both the fixed and the variable data must be punched into the cards when the latter are presented to the machine. Among other things this has the drawback that each punch card can be used only a very restricted number of times, namely at the utmost as many times as the number of columns required for the variable data is contained in the number of columns available on said card for said data. It also often happens that the number of available columns on each punch card is insufficient for the number of data to be handled. Another drawback consists in that the number of good legible prints per card is normally no more than three, which in many cases is too few.

An object of the invention is a method and a machine in which the drawbacks referred to above are removed or minimized.

According to the invention, accounting and similar data recorded on punching cards or the like are transferred to light sensitive material by means of a machine comprising a rotating drum, a number computable from said data being at the same time computed and registered in a decade counter, a signal being presented to said machine in the interval between the passing of two successive cards through said machine for also recording said computed number on said light sensitive material by means of said rotating drum.

The machine according to the invention for photographically recording fixed and variable data presented thereto comprises a rotating drum, in the transparent cylindrical wall of which are provided three groups of columns, each having a series of digits, the columns of each group being arranged end to end in the circumferential direction and staggered in the axial direction, stationary flash lamps being arranged within and around the axis of said drum at the apices of a polygon, one lamp for each group, one of said lamps lying diametrically opposite a fixed window extending axially along the outside of said drum, the other two lamps being arranged laterally with regard to said one lamp, mirrors being so arranged as to throw the flashes from said other two lamps towards said fixed window, and cylindrical lenses being interposed between each of said three lamps and said window.

By the use of the invention it becomes possible to punch only those fixed data into the card which are required for the calculations (additions or multiplications) which are to be performed by the calculating machine mentioned above, so that such a card, as long as those data need not be modified, may be used a practically unlimited number of times.

However, use may also be made for the fixed data of pre-printed or pre-typed lists, as will be explained herebelow.

In both cases the card and/or the list must be made from a material which is sufficiently transparent to make by means of a photocopying machine prints of that line or those lines which contains or contain the matter which finally must appear on the sensitized paper upon which the prints are made. The prints may also be obtained indirectly by passing the cards below a film camera and making prints of the developed film pictures. In that case the cards and lists need not be transparent.

For making the required prints, the machine to which the cards and/or lists are fed, is combined with a photocopying machine which may be of a well-known type, such as for instance the machine known under the registered trademark "Copycat Systematic" and which is able to produce at a high speed a large number of good legible copies. In the meantime said speed is still so much lower than that of machines including an electronic calculating mechanism, that if a machine of the last mentioned type is used, the useful effect of the installation may be increased by combining said calculating machine with a number of photo-printing machines which are all fed by said one calculating machine.

When pre-printed lists are used the invoicing in medium and large sized concerns may be very much simplified. Then the representative need only enter the variable data, for instance the ordered quantities, on said lists, upon which the description of the article, the price per unit, the discount etc. may be pre-printed either in a normal writing and in addition in a writing which can be read by conventional photocells, or only in a normal writing made by a typewriter, namely if the machine is equipped in a conventional manner with photocells arranged for reading said writing.

If said lists are passed through the machine it only enters those data of those lines upon which an ordered quantity is filled in, performs the required multiplication, enters the result on the line concerned and at the same time registers it in an electronic counter. The total amount present in said counter is also entered at the end of the list and thereupon the list is passed through the photocopying machine. Also in said machine only those lines are copied which contain orders which are listed one below the other at a normal line space. Then the print may be directly used as an invoice.

If transparent punch cards are used, upon which consequently only fixed data are indicated in a form which may be read by the machine, then the variable data may be registered in or on a tape which is passed through the machine together with the cards. For each line the machine performs the required calculation, if any, mostly a multiplication, and enters the results line for line on the same tape. Thereupon the cards and the tape are together fed to a photocopying machine wherein the lines on which a result is entered, are directly made visible on a sheet of photocopying paper one below the other.

The fixed data of the punch card may also be first printed on a sheet of transparent sensitized material from which the prints to be used may be subsequently made, and the variable data contained on masks may be added to the fixed data line for line. Thereupon the machine performs the calculations and enters the results behind each line. The copies to be used may be made in a manner described above in a photo-printing machine combined with the machine.

In addition to the fixed data on the punch card referred to above also other data which in respect of the punch card are variable but in another respect, for instance of the client concerned, are fixed, such as his name and address, may be photo-copied simultaneously by means of a film mask. The punch card is and remains useful also for other clients.

If the numbers, consequently the digits, to be fed to the machine must be coded, preferably use is made of the 1, 2, 4, 7 code, which renders it possible to fill in the cards in such a manner that they can be used to a practically unlimited extent, at least if the fixed data remain unchanged.

Now punch cards distributed among different magazines may be kept in readiness upon which cards the cost price of 1 and 2 and 4 and 7 units, as the case may be, are already pre-punched as fixed data, and if desired also the cost price of 10, 20, 40 and 70 and even of 100, 200, 400 and 700 units if large orders occur. Then each card has in its magazine its own code number by means of which it can be selected by the machine. The wanted code number (sort of article) as well as the wanted quantity of said number may be manually set on a panel. The cards carrying said code number required in connection with said quantity may be removed from their respective magazines by the machine and presented to the machine.

In special cases in which it is desirable to perform such a sorting, for example for statistical purposes or for making various bookings in all kinds of administration departments whereby one and the same data must be utilized a number of times, an automatic punching machine can be coupled to the electronic calculating mechanism of the machine which automatically makes a punch card of each line on which a calculation is performed. Of course the photocopying process described above is continued in the meantime.

It has already been stated that the prints required can also be obtained indirectly, by pasing the cards or lists below a film camera and by making prints of the developed film pictures.

However, as a rule, such film pictures will be of such a small size that in order to render them legible they must be enlarged. For practical reasons only photographic material, such as bromide paper, could be used for this purpose which makes this method expensive. We have now found that by giving the many times cheaper photocopying paper a photosensitivity, which is as much higher than that hitherto usual, the film pictures mentioned above may be represented thereon sufficiently enlarged without unsuitably long exposure times or unreasonably strong light sources being required. This renders the indirect method via film pictures even more economical than the direct method.

Also for making visible the final totals registered in the decade counter use can be made of film pictures and thereby it is not necessary first to print said totals on paper via electromagnetic counters which exhibit a large mechanical inertia and consequently cause much loss of time, and thereupon to photocopy them similarly to the procedure adopted in the direct photocopying method.

A device designed by applicants for making visible via a film totals registered in the counters is illustrated in the accompanying drawing, in which only those parts are shown which are essential for the invention, in which;

FIG. 2 is a section taken along line II—II of FIG. 1; and

FIG. 3 is a portion of a developed drum of the device of FIGS. 1 and 2 showing a series of number groups thereon.

Figure 1:
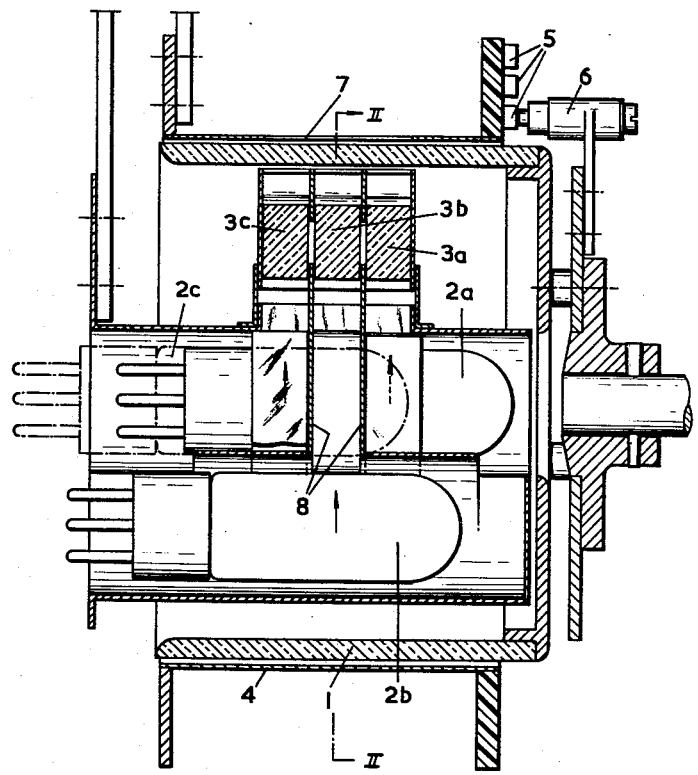
FIG. 1 is a longitudinal sectional view of the device according to the invention.

The machine comprises a continuously rotating hollow cylinder or drum, mounted opposite the film camera (not shown) and having a transparent wall 1 on which there are provided series of characters, e.g. 9 down to and including 0, or A up to and including Z, as the case may be. Each of said series extend in the circumferential direction of the cylindrical wall over a distance equal to the $1/n$th part of the total circumference, $n$ being the number of decades of the computing machine (not shown), adjacent series lying end to end but spaced from each other in the axial direction at small distances, e.g. 2.2 mm. Assuming the said number of decades to be seven, each of said series of characters will occupy a column extending over $\frac{1}{7}$ part of the circumference. The number seven is, of course, arbitrary and may be either larger or smaller. Each group of adjacent series, occupying together the entire circumference of the cylinder, in the example chosen therefor each group of seven such series form a unit by means of which a number of seven digits, presented to the machine by the computer or otherwise, may be recorded. In the example shown there are three such groups, lying axially side by side.

Mounted inside said cylinder there are three flash lamps. $2a$, $2b$ and $2c$ respectively, one for each of said groups, said lamps each having a very short flash time, e.g. $10^{-4}$ sec. and mounted around and with their axes parallel to the axis of the cylinder, the lamps preferably being at the apices of a regular polygon.

The flashes from the lamp $2b$ are concentrated by means of a cylindrical lens $3b$ on a ground glass window 7 provided in a fixed metal sleeve 4 round the cylinder. The flashes from the lamps $2a$ and $2c$ respectively are reflected by mirrors $5a$ and $5c$ respectively and concentrated by cylindrical lenses $3a$ and $3c$ respectively on said ground glass window 7.

In order to occupy their most favorable positions the lamps $2a$, $2b$ and $2c$ are axially shifted with respect to each other, as shown in FIG. 1. Furthermore their light rays are screened from each other by means of partition walls 8.

In the example shown and described so far, where the number of decades is assumed to be seven, there will appear on the ground glass of window 7 three numbers, each of at the utmost seven digits. If larger numbers are required the number of series forming a group may be chosen larger than seven without difficulty. If more than three numbers are required to be recorded, two or more sets, each comprising three flash lamps, lenses and mirrors may be axially arranged side by side within a rotating cylinder or drum.

The current pulses required for firing the flash lamps are supplied to each of the flash lamps via collectors 5 having each as many segments as there are digits in each group and a wiper 6 connected to the related flash lamp, said wipers passing said collectors in synchronism with the rotating cylinder. If the segment of the collector corresponding with one of the digits is made live under control of the decade counter the flash lamp will fire at the moment the wiper passes said segment, at which moment the same digit on the circumference of the cylinder will lie in the axis of the camera and it will be projected onto said ground glass window as a flash picture. The camera will register the picture on the film preferably between the entry of two successive punch cards.

After a complete revolution of the cylinder in this manner the digits of all the decades will have been projected successively on to the ground glass screen side by side and they will have been registered on the film.

Naturally the speed of rotation of the cylinder must be matched to the speed at which the punch cards run through the machine. If this speed is very high then there is a risk of the projected pictures of the digits becoming blurred, unless the duration of the light flashes can be made extremely short, which will not be always possible.

In order to eliminate this drawback, a rotating drum can be arranged in the path of the light rays, the circumference of which is provided with as many parabolic mirrors as there may be digits in the circumferential direction of the cylinder. Said drum must be rotated in a direction opposite to that of the cylinder and at half the speed of revolution thereof.

By means of the device just described it is possible to make the product of two or more factors punched in a card or indicated in another manner, visible adjacent the card, for instance on a ground glass window, and to register it within the time the card runs through the machine, so that in this case the product need not be prepunched in the card, but it may be calculated and registered for each card at the same time the cards run through a tabulating machine, which then may have a capacity of 48,000 cards an hour. Those columns on the punch cards which up to now had to be used for said products, are now available for other data.

The fixed data which are usually coded along the upper edge of the punch card, after having been translated into writing, be registered together with the totals computed by the machine on a picture film. In applying this method it is possible to use a machine of the type described having a rotating cylinder for making said writing visible, and to do so at any desired region along the axis of said cylinder.

A control on the accurate functioning of the computer may be exerted for additions and subtractions by making the machine generate a fixed number of pulses between any two successive entries of a card, and for multiplications by causing each multiplication by a certain number to be followed by a division through the same number (zero-control). The machine will be blocked by each faulty result.

We claim:

An accounting machine for photographically recording fixed and variable data presented thereto, comprising a rotating drum having a transparent cylindrical wall with a plurality of groups of columns of indicia thereon, each column having a series of digits of the indicia, the columns of each group being arranged end to end in the circumferential direction of said drum and staggered in the axial direction of said drum, and said groups being spaced in the axial direction of said drum, a plurality of flash lamps equal in number to the number of groups and fixed within said drum around the axis of said drum at the apices of a regular polygon, a fixed window outside said drum and extending axially thereof, one of said lamps lying diametrically opposite said window and the other lamps being arranged laterally with respect to said one lamp, walls in said drum extending transversely of said drum and spaced axially along said drum distances equal to the spacing of said groups from each other, the space between two of said walls being unobstructed for permitting flashes from said one lamp to shine directly toward said fixed window, mirrors mounted in the spaces between said other walls and positioned for reflecting flashes from said other lamps toward said fixed window, and cylindrical lenses interposed between each of said lamps and said window.

References Cited in the file of this patent

UNITED STATES PATENTS

| | | |
|---|---|---|
| 1,933,650 | Bascom | Nov. 7, 1933 |
| 2,278,993 | Johnson | Apr. 7, 1942 |
| 2,291,926 | Sperti | Aug. 4, 1942 |
| 2,352,914 | Rackett | July 4, 1944 |
| 2,364,188 | Bryce | Dec. 5, 1944 |
| 2,551,683 | Levy | May 8, 1951 |
| 2,726,940 | Buhler | Dec. 13, 1955 |